United States Patent
Reunamaki et al.

(10) Patent No.: US 10,972,545 B2
(45) Date of Patent: *Apr. 6, 2021

(54) METHOD AND APPARATUS FOR MULTIPATH COMMUNICATION

(71) Applicant: Nokia Technologies Oy, Espoo (FI)

(72) Inventors: Jukka Pekka Reunamaki, Tampere (FI); Arto Palin, Viiala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,742

(22) Filed: Jun. 5, 2020

(65) Prior Publication Data
US 2020/0304576 A1 Sep. 24, 2020

Related U.S. Application Data

(63) Continuation of application No. 16/005,417, filed on Jun. 11, 2018, now Pat. No. 10,721,308, which is a continuation of application No. 15/646,726, filed on Jul. 11, 2017, now Pat. No. 10,021,191, which is a continuation of application No. 13/514,279, filed as application No. PCT/FI2009/050998 on Dec. 14, 2009, now Pat. No. 9,723,083.

(51) Int. Cl.
*H04L 29/06* (2006.01)
*H04L 29/08* (2006.01)

(52) U.S. Cl.
CPC .............. *H04L 67/14* (2013.01); *H04L 69/14* (2013.01); *H04L 69/18* (2013.01); *H04L 69/24* (2013.01); *Y02D 30/50* (2020.08)

(58) Field of Classification Search
CPC ......... H04L 67/14; H04L 69/14; H04L 69/18; H04L 69/24
See application file for complete search history.

(56) References Cited

U.S. PATENT DOCUMENTS

| | | | |
|---|---|---|---|
| 6,523,126 | B1 | 2/2003 | Brabenac |
| 7,567,826 | B2 | 7/2009 | Sugaya |
| 7,831,717 | B2 | 11/2010 | Palin et al. |

(Continued)

FOREIGN PATENT DOCUMENTS

| | | |
|---|---|---|
| EP | 1843550 | 10/2007 |
| WO | WO-2006131130 | 12/2006 |
| WO | WO-2010109054 | 9/2010 |

OTHER PUBLICATIONS

Multipath TCP (MPTCP) BOF, Tsv Area Wiki, Retrieved on Jun. 19, 2013, Webpage available at: http://trac.tools.ietf.org/area/tsv/trac/wiki/MpTcpBofDescription.

(Continued)

*Primary Examiner* — Melvin C Marcelo
*Assistant Examiner* — Natali Pascual Peguero
(74) *Attorney, Agent, or Firm* — Mintz Levin Cohn Ferris Glovsky and Popeo, P.C.

(57) ABSTRACT

In accordance with an example embodiment of the present invention, there is provided a method, comprising exchanging connectivity information, setting up a connection, determining that a correspondent node has at least one access in an inactive state, and transmitting a request to the correspondent node to activate at least one of the at least one access in an inactive state. The setting up may be done based on the exchanged connectivity information.

10 Claims, 5 Drawing Sheets

(56) References Cited

U.S. PATENT DOCUMENTS

| | | | |
|---|---|---|---|
| 8,560,671 B1* | 10/2013 | Yahalom | G06F 9/5016 709/224 |
| 9,723,083 B2 | 8/2017 | Reunamaki et al. | |
| 2004/0246971 A1 | 12/2004 | Banerjee et al. | |
| 2005/0036491 A1 | 2/2005 | Ogawa et al. | |
| 2005/0268151 A1 | 12/2005 | Hunt et al. | |
| 2006/0056336 A1 | 3/2006 | Dacosta | |
| 2006/0217072 A1 | 9/2006 | Poyhonen et al. | |
| 2008/0198764 A1 | 8/2008 | Keller | |
| 2008/0291986 A1 | 11/2008 | Lida et al. | |

OTHER PUBLICATIONS

Ernst, et al., Goals and Benefits of Multihoming, Internet-Draft, Feb. 9, 2004, pp. 1-17.

Ernst, et al., Goals and Benefits of Multihoming, Monami 6 Working Group, Internet-Draft, Oct. 26, 2005, pp. 1-14.

Ford, et al., Architectural Guidelines for Multipath TCP Development, Internet Engineering Task Force, Internet-Draft, Oct. 19, 2009, pp. 1-20.

Ford, et al., TCP Extensions for Multipath Operation with Multiple Addresses, Internet Engineering Task Force, Internet-Draft, Jul. 10, 2009, pp. 1-31.

Gurtov, et al., Secure Multipath Transport for Legacy Internet Applications, Sixth International Conference on Broadband Communications, Networks, and Systems, Sep. 14-16, 2009, pp. 1-8.

International Search Report and Written Opinion for corresponding International Patent Application No. PCT/F12009/050998, dated Jun. 28, 2010, 12 pages.

Sharifi, Multipath Routing Model, Multipath Routing, CS 522, 2003, pp. 1-17.

Multipath TCP (MPTCP) BOF, Tsv Area Wiki, Retrieved on Jun. 19, 2013, Webpage available at: http://trac.tools.ietf.org/area/tsv/tradwiki/MpTcpBofDescription.

* cited by examiner

METHOD AND APPARATUS FOR MULTIPATH COMMUNICATION

This application is a Continuation of application Ser. No. 16/005,417 filed on Jun. 11, 2018, entitled "METHOD AND APPARATUS FOR MULTIPATH COMMUNICATION," which is a Continuation of application Ser. No. 15/646,726 filed on Jul. 11, 2017, entitled "METHOD AND APPARATUS FOR MULTIPATH COMMUNICATION," which is a Continuation of application Ser. No. 13/514,279 filed on Jun. 6, 2012, entitled "METHOD AND APPARATUS FOR MULTIPATH COMMUNICATION," which is a National Phase Application of PCT/FI2009/050998 filed on Dec. 14, 2009, entitled "METHOD AND APPARATUS FOR MULTIPATH COMMUNICATION." The entire contents of these applications are incorporated herein by reference in their entirety.

TECHNICAL FIELD

The present application relates generally to multipath communication in cellular, ad hoc, mesh or similar networks.

BACKGROUND

Communication between nodes may be effected using transmission control protocol, TCP, for example. Traditionally TCP connections have connected corresponding nodes such that a TCP connection has been defined between a first address of a first node and a second address of a second node.

More recently, multipath TCP, MPTCP, has been defined, where first and second nodes may comprise pluralities of addresses. In communication according to MPTCP, a multipath connection comprises a plurality of individual connections connecting addresses of the first and second nodes. With reference to the example illustrated in FIG. 1, a multipath connection may comprise an initial and an additional connection. In the example illustrated, host A initiates an initial connection from its address A1 to an address B1 of host B. Host A further initiates an additional connection from its address A2 to address B1 of host B. The additional connection could equally be initiated from address A2 to address B2. The initial and additional connections may be considered to be individual paths or connections in the overall multipath connection.

SUMMARY

Various aspects of examples of the invention are set out in the claims.

According to a first aspect of the present invention, there is provided a first apparatus comprising logic circuitry configured to cause a connection to be set up, the logic circuitry configured to cause transceiver circuitry to transmit first connectivity information relating to the apparatus comprising information on at least one access comprised in the apparatus not in use. The transceiver circuitry is also configured to receive a request relating to the at least one access not in use. The logic circuitry is configured to cause at least one of the at least one access not in use to become activated responsive to receipt of the request, and the logic circuitry is configured to cause the transceiver circuitry to transmit second connectivity information relating to the apparatus, the second connectivity information comprising information on the at least one access.

According to a second aspect of the present invention there is provided a second apparatus comprising at least one processor and at least one memory including computer program code, the at least one memory and the computer program code configured to, with the at least one processor, cause the apparatus to perform at least the following: exchanging connectivity information; setting up a connection; determining that a correspondent node has at least one access in an inactive state; and transmitting a request to the correspondent node to activate at least one of the at least one access in an inactive state.

In some embodiments the second apparatus is configured to transmit the request responsive to a determination that the connection would benefit from additional capability. In some embodiments, the second apparatus is configured to transmit the request responsive to a determination that the transmission capability of the connection has declined. The first apparatus and the second apparatus may be configured to add at least one new path to an existing multipath connection, or transform a single-path connection to a multipath connection by adding at least one path to it.

According to a third aspect of the present invention, there is provided a method, comprising exchanging connectivity information, setting up a connection, determining that a correspondent node has at least one access in an inactive state, and transmitting a request to the correspondent node to activate at least one of the at least one access in an inactive state. The setting up may be done based on the exchanged connectivity information.

The method may further comprise determining additional capability that the connection could benefit from. The additional capability may comprise bitrate, delay performance and/or security capabilities.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
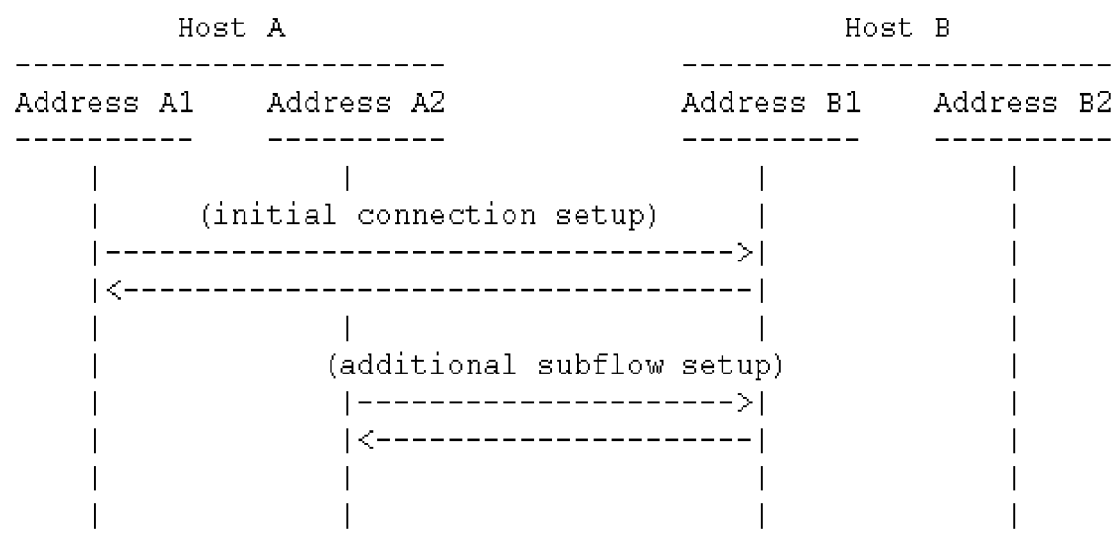
FIG. 1 illustrates an example of a multipath connection.
Figure 2:
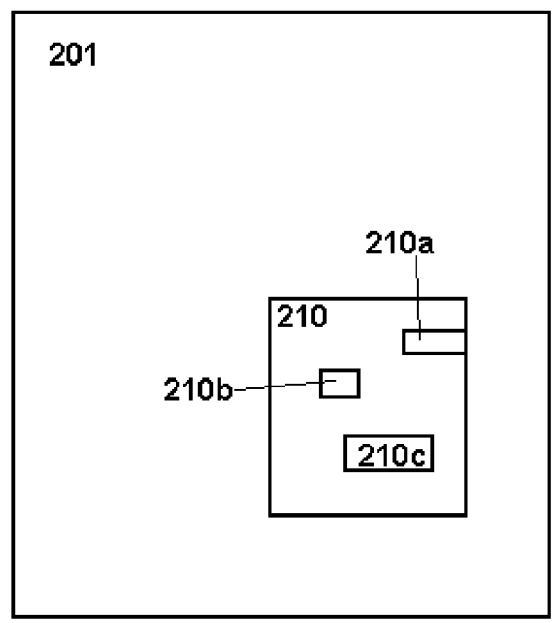
FIG. 2 illustrates an example apparatus capable of supporting embodiments of the present invention.

FIG. 2 illustrates an example apparatus 201 capable of supporting embodiments of the present invention. The apparatus may correspond to host A or B of FIG. 1 or, for example, an access point or base station or a wireless communication device The apparatus is a physically tangible object, for example a cellular telephone, personal digital assistant, laptop, portable multimedia computer or other mobile apparatus. The apparatus may comprise a control apparatus 210, for example a digital signal processor (DSP), processor, field-programmable gate array (FPGA), application-specific integrated circuit (ASIC), chipset or controller. The apparatus may further comprise transceiver circuitry 210a configured to enable the apparatus 201 to connect to a network. The apparatus may comprise memory 210b configured to store information, for example information relating to a threshold value of a delay requirement. The memory may be solid-state memory, dynamic random access memory (DRAM), magnetic, holographic or other kind of memory. The apparatus may comprise logic circuitry 210c configured to access the memory 210b and control the transceiver circuitry 210a. The logic circuitry 210c may be implemented as software, hardware or a combination of software and hardware. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transceiver circuitry 210a. The logic circuitry 210c may be control circuitry. The transceiver circuitry 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transceiver circuitry 210a, memory 210b and logic circuitry 210c may be comprised in the apparatus as hardware elements such as integrated circuits or other electronic components. The same applies if the apparatus 201 does comprise a control apparatus 210 but some, or all, of the transceiver circuitry 210a, memory 210b and logic circuitry 210c are not comprised in the control apparatus 210.

Figure 3:
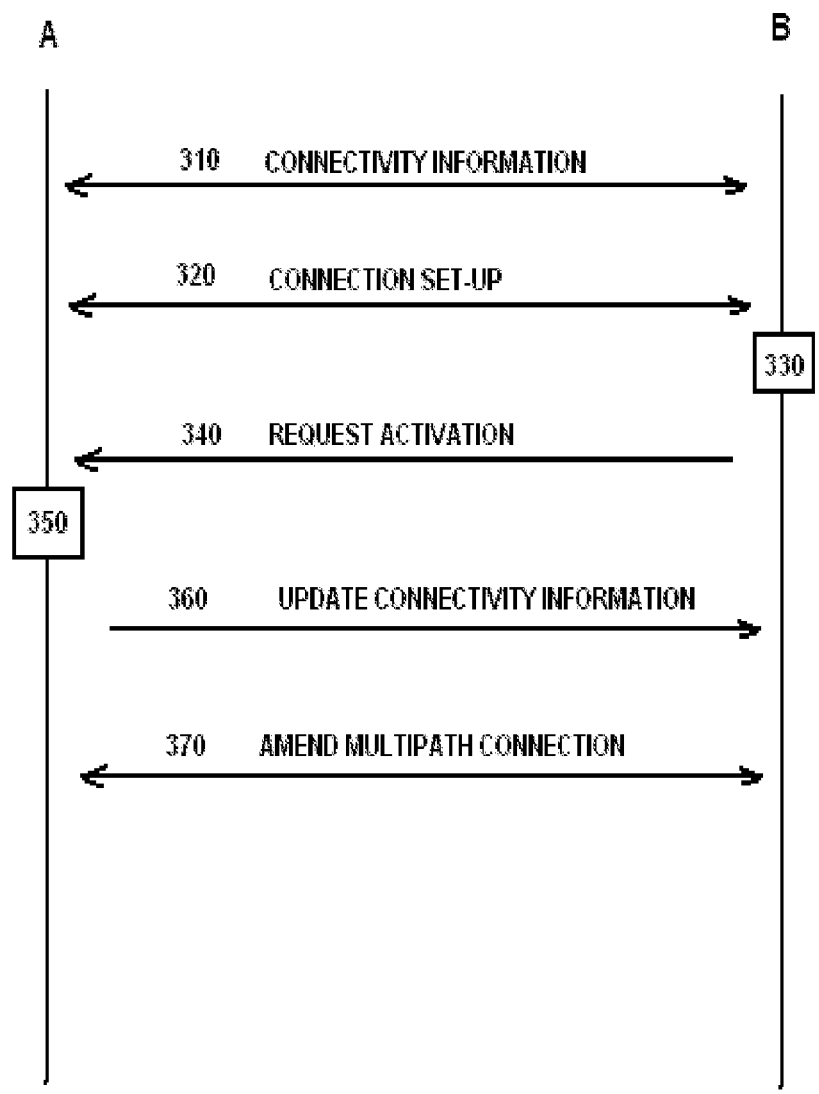
FIG. 3 illustrates an example of a signaling flow according to an embodiment of the invention.

FIG. 3 illustrates an example of a signaling flow according to an embodiment of the invention. The hosts A and B may be, for example, apparatuses as illustrated in FIG. 2. The hosts A and B may be nodes in an ad-hoc, mesh or cellular network. The hosts A and B may have wireless and/or wire-line connections to the Internet or to each other via other, for example ad hoc type networks. Hosts A and/or B may be constructed according to a network on terminal architecture, e.g. NoTA. Hosts A and B may be furnished with more than one access each, so that at least one of the hosts A and B may be capable of connectivity using more than one access. Examples of accesses that may be disposed in a host A and/or B are Bluetooth, wireless local area networking, WLAN, wideband code division multiple access, WCDMA, long term evolution, LTE, local area networking, LAN, and Zigbee accesses and similar accesses. Hosts A and/or B may also be disposed with more than one access of the same type, for example two WLAN accesses.

In phase 310, hosts A and B exchange connectivity information. This connectivity information may be considered to be first connectivity information. In some embodiments, L_IN functionality of NoTA is used to exchange connectivity information. The connectivity information may comprise, for example, information on accesses disposed in the hosts A and/or B. The information may comprise address information, for example in a case where host A has two active accesses, the information may comprise information on these two accesses and their associated address information. Address information may comprise, for example, internet protocol, IP, address information but in case different addressing system is used the address information may comprise, in addition or instead of IP address information address information according to this other addressing system. The connectivity information may also comprise capability information relating to specific accesses disposed in the respective hosts. Capability information may comprise information on capabilities of a specific access, for example bitrate, delay, reliability and/or security characteristics of the access. The connectivity information may comprise information on whether accesses disposed in a host are active or not active. In detail, the connectivity information may comprise information that a host is disposed with at least one access that is currently not in use, in other words the access is in an inactive state. Examples of inactive states may include power-off and hibernation states. The connectivity information may comprise capability information relating to accesses in an inactive state.

In phase 320, hosts A and B set-up a connection. The connection may be a single-path or a multipath connection, or the connection may be a single-path connection that is modified to a multipath connection during set-up or subsequently. In some embodiments, the connection is set-up as a single-path or multipath connection and the connectivity information is at least partially exchanged over the connection. In this case, phase 320 precedes phase 310. In some embodiments, a further host C, not illustrated, is disposed in the system. Host C may relay connectivity information between hosts A and B. For example, host A may transmit its connectivity information to host C, and host C may then forward the the connectivity information of host A to host B. Additionally or alternatively, connectivity information of host B may be relayed to host A via host C. Connection set-up may proceed based on, for example, TCP procedures or MPTCP procedures. Following connection set-up, the hosts are capable of communicating over the connection.

In phase 330, host B may determine that the connection could benefit from additional capability. For example, host B may determine that traffic over the connection is causing congestion, whereby additional communication capacity could benefit the connection by increasing its overall communication capacity. Alternatively host B may determine, for example, that traffic to be communicated over the connection is of a sensitive nature whereas the connection does not support encryption. In this case the connection would benefit from addition of a path supporting encryption, to allow transmission of sensitive traffic. A further example is that traffic to be communicated over the connection has more stringent delay requirements than is currently provided by the connection. In this case, the connection would benefit from addition of a path with good delay performance, to meet the delay requirements of the traffic. In phase 330, host B determines whether the connectivity information relating to host A indicates host A has at least one access in an inactive state. If host A has at least one access in an inactive state, host B may further determine from capability information relating to the at least one access of host A in an inactive state, if the capabilities of the at least one access in an inactive state would provide additional capability of the needed kind to the connection, if the access was to be taken into use.

Responsive to determining that host A has an access in an inactive state, which could benefit the connection if a path to the access was to be added to the connection, host B may transmit to host A a request to activate the access in an inactive state at phase 340. Alternatively, host B may request host A to activate an access in an inactive state when there is no determination of a need for additional capability concerning the connection. A plurality of paths may result in faster overall communication over the connection, so host B need not make a determination of a need for additional capability concerning the connection in order to take steps to improve the connection by adding a new path. In some embodiments, host B may make a determination of a need for additional capability concerning the connection and transmit a request to host A to activate at least one access in an inactive state, without consulting capability information. This may be the case, for example, if capability information concerning the at least one access in an inactive state has not been furnished. In some embodiments, host B may transmit a request to activate an access in an inactive state responsive to determining that the transmission capability of the connection has declined. A determination of such decline may be made by observing that retransmissions have become more frequent. A determination of declined communications capability may also be made by observing that a link-level adaptation has occurred, for example a larger spreading factor has been taken into use in a code-division multiple access path. In some embodiments, host B may request that an access disposed in host A be activated partially. For example, if the concerned access is based on the Bluetooth technology, partial activation may comprise activating a Bluetooth access but not activating a profile relating to it. The profile may subsequently be activated responsive to signaling.

In phase 340, host B transmits to host A a request to activate at least one access in an inactive state. The request may be transmitted over the connection, or it may be transmitted outside the connection using a separate control connection, or the request may be transmitted out-of-band. Transmitting out-of-band may be associated with the effect that the request can be delivered when the connection is experiencing poor transmission capability, for example due to fading or congestion. The request may comprise a separate identifier relating to each access requested to be activated. The identifiers may relate, for example, to communication technologies the respective accesses are based on. In embodiments where capability information relating to the at least one access in an inactive state is available to host B, the request may comprise information relating to settings at which the at least one access is requested to be activated.

In phase 350, responsive to receiving the request 340, host A changes a mode of at least one access from an inactive mode to an active mode. This may comprise switching an access on. In some embodiments, it comprises establishing connectivity via the activated access, for example to a cellular network in embodiments where the activated access is a cellular access. In embodiments where the activated access is a WLAN access, for example, establishing connectivity comprises establishing connectivity to a WLAN access point. Establishing connectivity may comprise obtaining address information associated with the activated access.

In phase 360, host A transmits to host B updated, or second, connectivity information comprising connectivity information relating to the activated at least one access. The connectivity information may comprise capability information and/or address information.

In phase 370, hosts A and B amend the connection by adding to it a path to each of the activated at least one access. If the connection comprised only a single path before phase 370, it is thereby converted into a multipath connection. If it comprised a plurality of paths before phase 370, the number of paths is incremented by the number of new paths. The new path or paths may connect the activated at least one access to the same address of host B, or to different addresses of host B. In some embodiments, phases 360 and 370 may occur as a joint phase. In some embodiments, host B may activate an access it is disposed with and which is in an inactive state in connection with sending the request of phase 340. The newly activated accesses in hosts A and B may then be connected by a new path added to the connection.

Using a process similar to the one illustrated in FIG. 3, paths corresponding to capability identified as unnecessary may be removed from a multipath connection, and the corresponding accesses placed in an inactive state. In that case, at a phase corresponding to phase 330 it would be determined, that the multipath connection has unneeded capability. It is then determined, that an access can be switched to an inactive state and paths connecting to it can be removed from the multipath connection, without degrading the capability of the multipath connection below a level that is considered to be adequate.

Figure 4:
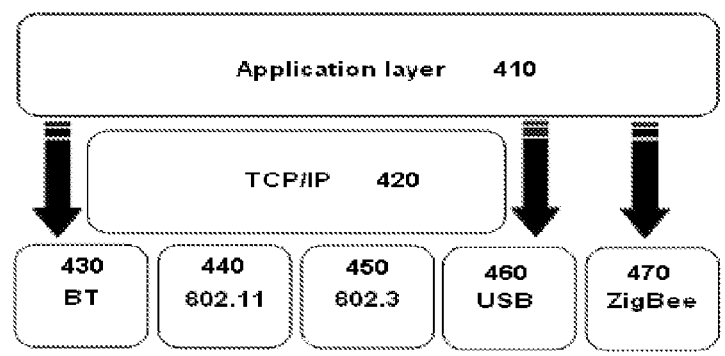
FIG. 4 illustrates an example of an apparatus capable of supporting embodiment of the present invention, the apparatus comprising multiple accesses.

FIG. 4 illustrates an example of an apparatus capable of supporting embodiment of the present invention, the apparatus comprising multiple accesses. The apparatus may be an apparatus as illustrated in FIG. 2. The apparatus comprises an application layer 410, which is configured to handle application-specific functions such as requesting connections and causing connections to be terminated. The application layer 410 may provide a user interface for a user of the apparatus to interact with the application layer 410. The application layer 410 may comprise messaging software, a web browser, client/server functionality and/or other entities. The application layer 410 may comprise software in a memory, which is run on a processor device.

Below the application layer 410 resides a TCP/IP layer 420, which is configured to handle functions relating to the transmission control protocol and internet protocol. Examples of such functions include acknowledgements, transmission window management and multipath management. The application layer 410 may interface to the TCP/IP 420 layer, or it may interface to accesses comprised in the apparatus directly. The application layer 410 may also interface to some accesses comprised in the apparatus directly, and interface to the TCP/IP layer 420.

Below the TCP/IP layer reside the accesses disposed in the apparatus. In the example illustrated, the apparatus comprises Bluetooth 430, IEEE 802.11 440, IEEE 802.3 450, universal serial bus 460 and ZigBee 470 accesses. The accesses 430, 440, 450, 460 and 470 provide connectivity via their respective capabilities. Each access may be capable of obtaining a separate internet protocol, IP, address. The TCP/IP layer 420 may be configured to manage the addresses, and paths linking thereto, as part of managing a MPTCP connection.

Figure 5:
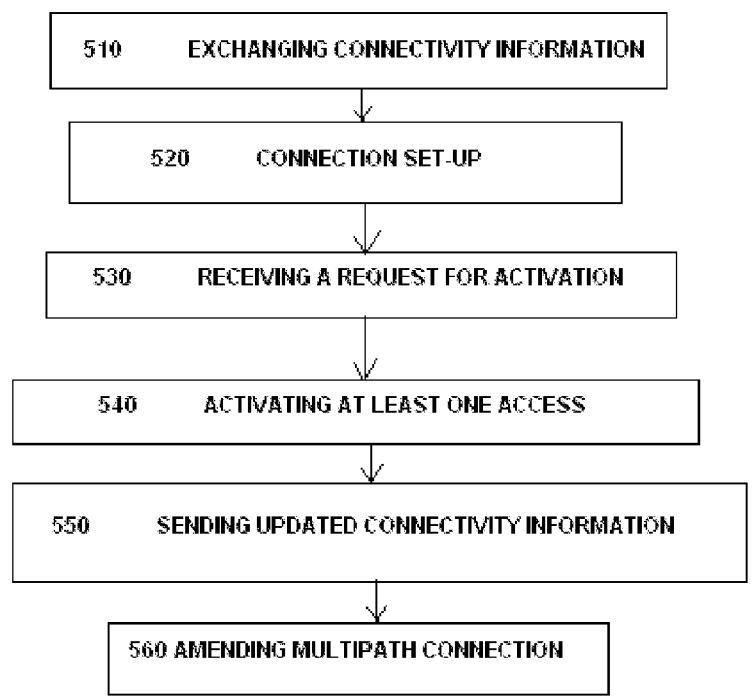
FIG. 5 is a flowchart illustrating an example of a method according to some embodiments of the invention.

FIG. 5 is a flowchart illustrating an example of a method according to some embodiments of the invention. In phase 510, connectivity information is exchanged. Connectivity information may comprise connectivity information described in connection with phase 310 of FIG. 3. Exchanging may comprise sending own connectivity information and receiving connectivity information from a correspondent host. Sending may occur first and receiving after, or receiving may occur first and sending after.

In phase 520, a connection is set up. Setting up may comprise participating in connection set-up with a correspondent host. Setting up may comprise participating as host A, for example, of FIG. 3 in phase 320. In some embodiments, the connection is set-up as a single-path or multipath connection and the connectivity information is at least partially exchanged over the connection. In this case, phase 520 precedes phase 510.

In phase 530, a message is received comprising a request to activate at least one access in an inactive state. The request may be received over the connection set-up in phase 520 or it may be received out-of-band. The request may comprise a separate identifier relating to each access requested to be activated. The identifiers may relate, for example, to communication technologies the respective accesses are based on. The request may comprise information relating to settings at which the at least one access is requested to be activated.

In phase 540, responsive to receiving the request in phase 530, at least one access in an inactive state is activated. Activating may comprise changing the state of an access from an inactive state to an active state. Activating may comprise activating at least one access in an inactive state using settings received in the request of phase 530. Activating may be partial. Partial activation may comprise changing the state of an access to an active state but not activating a profile relating to the access until further signaling is received. In case the received request comprises requests to activate more than one access in an inactive state, some or all of the requested accesses may be activated. In some embodiments, it may be determined, for example, that activating all the requested accesses would result in an unacceptable drain in available battery resources and only some of the requested accesses are activated.

In phase 550, updated connectivity information is transmitted to a correspondent host. The correspondent hose may be the host from which the request to activate at least one access in an inactive state was received in phase 530. The updated, or second, connectivity information may comprise connectivity information relating to the activated at least one access. The connectivity information may comprise capability information and/or address information.

In phase 560, the connection set-up in phase 520 is amended to include at least one new path to at least one access activated in phase 540. In some embodiments, phase 550 may be included in phase 560. In some embodiments, each access activated in phase 540 is separately addressable and paths to these accesses are defined by having one of their endpoints at these addresses. In some embodiments, paths are not added to each access activated in phase 540. In these embodiments, paths to these accesses may be added at a later point, as needed.

Without in any way limiting the scope, interpretation, or application of the claims appearing below, a technical effect of one or more of the example embodiments disclosed herein is that flexibility in maintaining multipath connections is increased. Another technical effect of one or more of the example embodiments disclosed herein is that unused and unnecessary accessed may be kept in an inactive state when not needed, conserving battery power. Another technical effect of one or more of the example embodiments disclosed herein is that capabilities of a multipath connection may be adapted according to identified need.

Embodiments of the present invention may be implemented in software, hardware, application logic or a combination of software, hardware and application logic. The software, application logic and/or hardware may reside on hosts A and B, which may be apparatuses according to FIG. 2. If desired, part of the software, application logic and/or hardware may reside in the control apparatus 210. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   at least one processor; and
   at least one memory, the at least one memory comprising instructions which, when executed by the at least one processor, cause the apparatus to at least:
   receive, from a node over a connection, connectivity information relating to a plurality of accesses comprised in the node, the plurality of accesses comprising at least one access that is inactive with respect to at least transmission and/or reception, the connectivity information indicating the at least one access is inactive;
   transmit, to the node over the connection, a request to activate the at least one access responsive to determining, based on the connectivity information, the at least one access has a capability needed on the connection;
   receive, from the node, updated connectivity information relating to the at least one access; and
   communicate, in response to receiving the updated connectivity information, with the at least one access over one or more separate paths on the connection, the connection being modified to add the one or more separate paths.

2. The apparatus of claim 1, wherein the apparatus is further caused to at least:
   determine that an additional capability of the connection is required for communication of at least one message; and
   determine, based on the connectivity information, that the at least one access is suitable for communication of the at least one message.

3. The apparatus of claim 2, wherein the apparatus is further caused to at least:
   compare, with the determined additional capability, capability information relating to the at least one access; and
   select, in response to the comparing, the at least one access.

4. The apparatus of claim 2, wherein the additional capability comprises at least one of bitrate, delay performance, and/or security.

5. The apparatus of claim 1, wherein the connection comprises a multipath transmission control protocol connection.

6. A method, comprising:
receiving, at a first node and from a second node over a connection, connectivity information relating to a plurality of accesses comprised in the second node, the plurality of accesses comprising at least one access that is inactive with respect to at least transmission and/or reception, the connectivity information indicating the at least one access is inactive;
transmitting, by the first node and to the second node over the connection, a request to activate the at least one access responsive to determining, based on the connectivity information, the at least one access has a capability needed on the connection;
receiving, at the first node and from the second node, updated connectivity information relating to the at least one access; and
communicating, by the first node and in response to receiving the updated connectivity information, with the at least one access over one or more separate paths on the connection, the connection being modified to add the one or more separate paths.

7. The method of claim 6, further comprising:
determining, by the first node, that an additional capability of the connection is required for communication of at least one message; and
determining, by the first node and based on the connectivity information, that the at least one access is suitable for communication of the at least one message.

8. The method of claim 7, further comprising:
comparing, with the determined additional capability, capability information relating to the at least one access; and
selecting, in response to the comparing, the at least one access.

9. The method of claim 7, wherein the additional capability comprises at least one of bitrate, delay performance, and/or security.

10. The method of claim 6, wherein the connection comprises a multipath transmission control protocol connection.

* * * * *